US009996327B2

(12) United States Patent
Kawahito (10) Patent No.: US 9,996,327 B2
(45) Date of Patent: *Jun. 12, 2018

(54) METHOD, PROGRAM, AND SYSTEM FOR CODE OPTIMIZATION (71) Applicant: International Business Machines Corporation, Armonk, NY (US)

(72) Inventor: Motohiro Kawahito, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/935,582

(22) Filed: Nov. 9, 2015

(65) Prior Publication Data

US 2016/0062752 A1 Mar. 3, 2016

Related U.S. Application Data (63) Continuation of application No. 13/893,810, filed on May 14, 2013, now Pat. No. 9,218,171.

(30) Foreign Application Priority Data

May 21, 2012 (JP) ................. 2012-115496

(51) Int. Cl.
*G06F 9/45* (2006.01)
*G06F 9/38* (2018.01)
(Continued)

(52) U.S. Cl.
CPC .............. *G06F 8/4441* (2013.01); *G06F 8/31* (2013.01); *G06F 8/443* (2013.01); *G06F 9/30036* (2013.01); *G06F 9/3824* (2013.01)

(58) Field of Classification Search
CPC . G06F 8/30; G06F 8/31; G06F 8/4443; G06F 9/30; G06F 9/3824; G06F 9/30036; G06F 8/4441; G06F 8/443
See application file for complete search history.

(56) References Cited

U.S. PATENT DOCUMENTS 4,001,570 A     1/1977  Gooding et al. ............. 708/673
5,070,451 A  *  12/1991 Moore ..................... G06F 8/31
                                                        712/32

(Continued)

FOREIGN PATENT DOCUMENTS

JP    2000-081983 A    3/2000
JP    2005-107816 A    4/2005

(Continued)

OTHER PUBLICATIONS

R.J. Chevance et al., "Static Profiling and Dynamic Behavior of Coblo Programs", [Online], 1978, pp. 44-57, [Retrieved from Internet on Dec. 14, 2017], <http://delivery.acm.org/10.1145/960000/953414/p44-chevance.pdf>.*

(Continued)

*Primary Examiner* — Ziaul A Chowdhury
(74) *Attorney, Agent, or Firm* — Jeffrey N. Giunta; Fleit Gibbons Gutman Bongini Bianco PL (57) ABSTRACT Method, program and system for code optimization. A sign assignment instruction with identically sized packed decimal format input and output operands is detected where the sign assignment instruction assigns a value of zero to a packed decimal data value input operand having a value of negative zero. If the input operand to the sign assignment instruction does not result from an add or subtract operation, or the value of the input operand is not greater than a value prior to that operation, the possibility that the value of the input operand of the sign assignment instruction is negative zero is checked when the input operand and the output (Continued)

operand have identical addresses. An instruction is generated and inserted for executing the sign assignment instruction only when there is the possibility that the operand value is negative zero.

9 Claims, 7 Drawing Sheets

(51) Int. Cl.
*G06F 9/44* (2018.01)
*G06F 9/30* (2018.01)

(56) References Cited

U.S. PATENT DOCUMENTS

| | | | |
|---|---|---|---|
| 5,644,748 A * | 7/1997 | Utsunomiya | G06F 9/3824 711/207 |
| 5,758,336 A | 5/1998 | Brady | |
| 5,815,719 A * | 9/1998 | Goebel | G06F 8/4441 717/146 |
| 5,835,744 A | 11/1998 | Tran et al. | 712/208 |
| 5,881,263 A | 3/1999 | York et al. | 712/217 |
| 5,966,534 A * | 10/1999 | Cooke | G06F 8/4441 717/155 |
| 6,035,123 A * | 3/2000 | Razdan | G06F 8/443 712/E9.035 |
| 6,725,450 B1 | 4/2004 | Takayama | 717/139 |
| 6,848,043 B1 * | 1/2005 | Yeh | G06F 9/3824 712/216 |
| 8,555,035 B1 * | 10/2013 | Patney | G06F 8/441 712/216 |
| 9,075,630 B1 * | 7/2015 | Smith | G06F 8/443 |
| 9,098,307 B2 * | 8/2015 | Bhaskaracharya | G06F 8/443 |
| 2002/0066090 A1 * | 5/2002 | Babaian | G06F 8/4441 717/156 |
| 2002/0144097 A1 * | 10/2002 | Kawahito | G06F 8/4441 712/220 |
| 2004/0255284 A1 * | 12/2004 | Kobayashi | G06F 8/41 717/151 |
| 2005/0155026 A1 | 7/2005 | DeWitt et al. | 717/158 |
| 2006/0101425 A1 * | 5/2006 | Donovan | G06F 8/443 717/136 |
| 2006/0190708 A1 * | 8/2006 | Schwarz | G06F 9/3001 712/221 |
| 2008/0034357 A1 * | 2/2008 | Gschwind | G06F 8/445 717/149 |
| 2008/0270506 A1 * | 10/2008 | Lundvall | G06F 7/38 708/495 |
| 2011/0072303 A1 * | 3/2011 | Hoogerbrugge | G06F 8/31 714/10 |
| 2011/0099354 A1 * | 4/2011 | Takashima | G06F 9/30036 712/214 |
| 2011/0191755 A1 * | 8/2011 | Guenthner | G06F 8/4441 717/140 |
| 2013/0047050 A1 | 2/2013 | Kuwamura et al. | 714/746 |
| 2013/0173891 A1 | 7/2013 | Carlough et al. | 712/222 |
| 2015/0248293 A1 * | 9/2015 | Gschwind | G06F 9/30036 712/225 |

FOREIGN PATENT DOCUMENTS

| | | |
|---|---|---|
| JP | 2008-102740 A | 5/2008 |
| JP | 2009-134523 A | 6/2009 |

OTHER PUBLICATIONS

Liang-Kai Wang et al., "A Decimal Floating-Point Adder with Decoded Operands and a Decimal Leading-Zero Anticipator", [Online], 2009, pp. 125-134, [Retrieved from Internet on Dec. 14, 2017], <http://ieeexplore.ieee.org/stamp/stamp.jsp?arnumber=5223343>.*

Michael J. Schulte et al., "Performance Evaluation of Decimal Floating-Point Arithmetic", [Online], 2005, pp. 1-8, [Retrieved from Internet on Dec. 14, 2017], <https://pdfs.semanticscholar.org/8666/78c9ded66328ce2ad8fdbb532ecfc3b5337a.pdf>.*

Mike Tien-Chien Lee et al. "Power Analysis and Minimumization Techniques for Embedded DSP Software", [Online], 1997, pp. 123-135, {Retrieved from Internet on Aug. 7, 2015], <http://ieeexplore.ieee.org/stamp/stamp.jsp?tp=&arnumber=555992>.

Vivek Tiwari et al., "Instruction Level Power Analysis and Optimization of Software", [Online], 1996, pp. 223-238, [Retrieved from Internet on Aug. 7, 2015], <http://download.springer.com/static/pdf/278/bok%253A978-1-4613-1453-0.pdf>.

Frederic N. Ris, "A Unified Decimal Floating Point Architecture for the Support of High-Level Language", [Online], 1976, pp. 18-23, [Retrieved from Internet on Aug. 7, 2015], <http://delivery.acm.org/10.1145/1060000/1053238/p18-ris.pdf>.

Marius Pirvu et al., "Using Machines to Learn Method-Specific Compilation Strategies", [Online], 2011, pp. 257-266, [Retrieved from Internet on Aug. 7, 2015], <http://delivery.acm.org/10.1145/2200000/2190072/05764693.pdf>.

* cited by examiner

METHOD, PROGRAM, AND SYSTEM FOR CODE OPTIMIZATION

BACKGROUND OF THE INVENTION

Field of the Invention

The present invention is related to a technique for optimizing a program, more particularly such as a COBOL program, that includes packed decimal variables.

Description of the Related Art

COBOL is a computer programming language developed in 1959 primarily for business use. It is still used today in mainframe computer systems and the like, partly to inherit past programming resources. One mainframe in computer systems is the System z, available by International Business Machines Corporation (registered trademark).

In COBOL, calculations of the type are internally performed in packed decimal, unless the types of calculations used are all designated explicitly as the binary type.

In a calculation that uses packed decimal, a sign can not be assigned correctly. For example, when the following calculations are made for four-digit variables, the resulting signs are incorrect.

−9999− 1=>−0
−1/10=>−0
−5000*2=>−0

The above values should be +0. When −0 is displayed as it is, it will give a strange feeling to the operator. Therefore, an instruction for correctly assigning a sign (positive or negative) is generated. Such an instruction will be referred to as a "ZAP".

A specific example of assembler code is as follows. For the expression "compute idx=idx− 1" in COBOL, in which the variable idx is defined as "01 idx pic s9(4)", the following code is generated.
1. PACK 272(3,13),24(4,8) tmp=PACK(idx)
2. SP 272(3,13),52(1,10) tmp=tmp− 1
3. NI 272(13),X '0F' Set the fifth digit to 0
4. ZAP 272(3,13),272(3,13) tmp=ZAP(tmp)
5. UNPK 24(4,8),272(3,13) idx=UNPK(tmp)

Assuming that the initial value of idx is −9999, the result of the calculation in 2 above is −10000. The variable idx is a four-digit number, −10000 is rounded in 3 above to −0000. The sign of this value is incorrect. Thus, with the ZAP instruction in 4 above, −0000 is changed to +0000.

The ZAP is very costly, leading to a decrease in speed. There is a demand for improving this problem. The following conventional techniques can be applicable to the optimization of COBOL and other programs.

A technique is described in Japanese Unexamined Patent Publication No. 2008-102740 as follows. In a language processing system which is executed by a processor in a computer system, in branch processing, as to a branch in which two references are first compared to determine whether they are identical. If the result is true, then a branch is made, otherwise a method for verifying equivalence of instances directed by the individual references is called, and a branch is made if the return value is true. This branch, according to the comparison between the references and its result, is removed on the condition that the probability of the result of the comparison between the references being true is sufficiently small and that the removal of the branch according to the comparison between the references and its result will hardly change the result of execution of the program.

A technique is described in Japanese Unexamined Patent Publication No. 2009-134523 as follows. In an assembler device 1 for converting an assembler source program to a machine language program executable by a processor 5, an extended macro instruction (Xld instruction and Xjnz instruction) included in the assembler source program is expanded to a basic instruction (ld instruction and jnz instruction) and an extended instruction (ext instruction). Thereafter, the expanded ext instruction is optimized by determining the numerical data of the operand and omitting a redundant instruction. If this optimization of the ext instruction has caused a change of the address of the label, the ext instruction is optimized again.

As described in Japanese Unexamined Patent Publication No. 2005-107816 an optimization compiler optimizes a load instruction for reading data from a memory in a target program to be optimized. The optimization compiler includes: partial redundancy removal means for performing, on load instructions for reading data from the memory to variables, a process of removing partial redundancy which does not cause spill processing when the variables are allocated to a register; reverse direction register detection means for detecting a free register, which is not allocated to any variable, in an execution route arriving at the load instructions by tracking the execution sequence reversely from the instructions that use the data read by the load instructions; and free register allocating means for allocating the free register detected by the reverse direction register detection means to the read destination variables onto which the load instructions read data.

As described in Japanese Unexamined Patent Publication No. 2000-81983 in order to eliminate redundant array range check, the following units are provided: a unit for eliminating redundant array range check by versioning for loop; a unit for optimizing the array range check by performing data flow analysis in the reverse order of execution; and a unit for collecting information about the array range checks already processed, by performing data flow analysis in the order of execution, and eliminating the redundant array range check on the basis of the collected information.

None of the above-described conventional techniques discloses nor suggests a technique for optimizing the use of a sign assignment instruction, like a ZAP, for correctly assigning a packed decimal sign.

SUMMARY OF THE INVENTION

An aspect of the present invention provides a method that includes detecting a sign assignment instruction that has an input operand and an output operand identical in size to each other where the sign assignment instruction operates on an input operand having a packed decimal format and assigns a value of zero to a packed decimal data value of the input operand having a value of negative zero. The method further analyzes, based on the detecting, the input operand of the sign assignment instruction to determine whether a value of the input operand results from an add or subtract operation and whether the value is greater than the value prior to the operation. The method further includes, based on the analyzing determining at least one of one of that the value of the input operand does not result from an add or subtract operation or that the value is not greater than the value prior to the operation, checking, based on the input operand and the output operand of the sign assignment instruction having identical addresses, a possibility that the value of the input operand of the sign assignment instruction is negative zero, and generating and inserting an instruction for executing the sign assignment instruction only when there is the possibility that the value is negative zero.

Another aspect of the present invention provides a computer readable non-transitory article of manufacture tangibly embodying computer readable instruction which, when executed cause a computer to detect a sign assignment instruction that has an input operand and an output operand identical in size to each other, where the sign assignment instruction operates on an input operand having a packed decimal format and assigns a value of zero to a packed decimal data value of the input operand having a value of negative zero. Based on detecting the sign assignment instruction, the input operand of the sign assignment instruction is analyzed to determine whether a value of the input operand results from an add or subtraction operation and whether the value is greater than the value prior to the operation. Based on determining at least one of one of that the value of the input operand does not result from an add or subtract operation or that the value is not greater than the value prior to the operation, a possibility that the value of the input operand of the sign assignment instruction is negative zero is checked check, based on the input operand and the output operand of the sign assignment instruction having identical addresses, and an instruction for executing the sign assignment instruction is generated and inserted only when there is the possibility that the value is negative zero.

Another aspect of the present invention provides a computer system for optimizing a sign assignment instruction for correctly assigning a packed decimal sign. The system includes a memory, a processor communicatively coupled to the memory and an optimization module communicatively coupled to the memory and the processor. The optimization module, when operating, detects a sign assignment instruction having an input operand and an output operand identical in size to each other. The sign assignment instruction operates on an input operand having a packed decimal format and assigns a value of zero to a packed decimal data value of the input operand having a value of negative zero. The optimization module, when operating, further analyzes, based on detecting the sign assignment instruction, the input operand of the sign assignment instruction to determine whether a value of the input operand results from an add or subtraction operation and whether the value is greater than the value prior to the operation. The optimization module, when operating, further, based on a determination of at least one of one of that the value of the input operand does not result from an add or subtract operation and that the value is not greater than the value prior to the operation, checks, based on the input operand and the output operand of the sign assignment instruction having identical addresses, a possibility that the value of the input operand of the sign assignment instruction is negative zero, and generates and inserts an instruction for executing the sign assignment instruction only when there is the possibility that the value is negative zero.

BRIEF DESCRIPTION OF THE DRAWINGS

Embodiments of the present invention will be described in reference to the drawings. It should be understood that the embodiments are intended to describe preferred modes of the present invention, and there is no intention to limit the scope of the present invention to the content described below. Unless otherwise specified, like reference numerals denote like parts in the drawings.

DETAILED DESCRIPTION OF PREFERRED EMBODIMENTS

An object of the present invention is to provide a technique of optimizing the use of a sign assignment instruction for correctly assigning a packed decimal sign.

Another object of the present invention is to provide a technique of optimizing the operating speed of a program by efficiently removing a costly sign assignment instruction for correctly assigning a packed decimal sign.

The present invention has been accomplished in view of the foregoing problems. According to the present invention, for a sign assignment instruction to correctly assigning a packed decimal sign, for example a ZAP instruction, when the input and output fields of the instruction are identical in size to each other, the optimization is carried out.

ZAP Instruction Removal Processing:

(1-1) Processing of removing a ZAP instruction or replacing it with a copy instruction when it can be determined that an input value of the ZAP instruction is not −0 at all times. This processing is performed when it can be determined that the input value results from an add operation or a subtraction operation and the value is greater than the value prior to the operation (for example, the operation of adding 1).

(1-2) Remove the ZAP instruction when the input and output addresses are also identical to each other.

(1-3) Replace the ZAP instruction with the instruction for copying the input to the output when it can be determined that the input and output addresses are different from each other and not overlapping each other.

ZAP Instruction Strength Reduction Processing:

(2-1) Processing of generating a code so as to generate an instruction for checking, in bit representation, the possibility that an input value of a ZAP instruction is −0, and skip the ZAP instruction or execute a copy instruction when there is no possibility that the input value is −0. The checking of the possibility of the input value being −0 is made rapidly by performing an AND between a sign part and 9 by creating a mask value corresponding to the number of digits.

(2-2) Refrain from executing the ZAP instruction when the input and output addresses are also identical to each other.

(2-3) Execute the instruction for copying the input to the output, rather than the ZAP instruction, when it can be determined that the input and output addresses are different from each other and not overlapping each other.

The removal technique including the above-described processes (1-1), (1-2), and (1-3) and the reduction technique comprising the above-described processes (2-1), (2-2), and (2-3) can be performed independently from each other, or can be applied together. Further, the reduction technique can be applied first, which can be followed by the removal technique.

In a first aspect of the present invention, the above-described function is implemented as a conversion tool for a compiled COBOL binary execution program.

In a second aspect of the present invention, the above-described function is implemented as an optimization function of a COBOL compiler.

According to the present invention, in a program using sign assignment instructions for correctly assigning packed decimal signs, such a sign assignment instruction is removed or the generation thereof is suppressed within a range ensuring a proper operation. This improves the operating speed of the resultant code.

Figure 1:
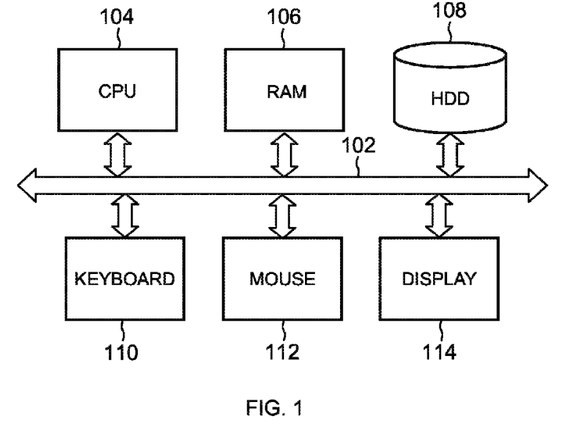
FIG. 1 is a block diagram showing the hardware configuration for carrying out the present invention.

Referring to FIG. 1, a block diagram of the computer hardware for implementing the system configuration and processing according to an embodiment of the present invention is shown. This computer hardware preferably has the configuration conforming to the IBM (registered trademark) System z (registered trademark) architecture.

Referring to FIG. 1, a CPU 104, a main storage (a RAM) 106, a hard disk drive (HDD) 108, a keyboard 110, a mouse 112, and a display 114 are connected to a system bus 102. The CPU 104 is preferably a z10 (trademark) processor chip. The main storage 106 is preferably one having a memory capacity of 16 GB or more. The hard disk drive 108 can be one having a memory capacity of 1 TB or more.

Although not individually illustrated, the hard disk drive 108 has an operating system stored therein in advance. The operating system is z/OS, can be any one of z/VM, z/VSE, and other operating systems that is compatible with the computer hardware being used.

The keyboard 110 and the mouse 112 are used to operate a program which has been loaded from the hard disk drive 108 to the main storage 106 and displayed on the display 114 by the function of the operating system, and to type characters.

The display 114 is preferably a liquid crystal display. A liquid crystal display having an arbitrary resolution, such as XGA (with a resolution of 1024×768) or UXGA (with a resolution of 1600×1200) can be used. Although not illustrated, the display 114 is used for displaying numerical values, such as accounting data, calculated by a COBOL program.

Figure 2:
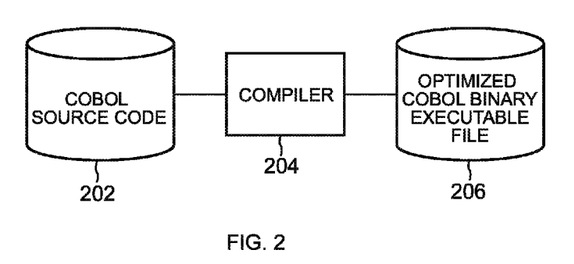
FIG. 2 is a block diagram showing the functional configuration of a first embodiment of the present invention.

In a first embodiment of the present invention, as shown in FIG. 2, the hard disk drive 108 stores a COBOL source code 202 and a compiler 204 in which a ZAP instruction removing/reducing function according to the present invention has been installed. In this case, in response to an operator's operation, an optimized COBOL binary executable file 206, with the ZAP instructions removed or reduced as appropriate, is generated directly from the COBOL source code 202 by the compiler 204. The resultant optimized COBOL binary executable file 206 is stored in the hard disk drive 108. Thus, a code optimization function according to the present invention that is included in the compiler 204 is called when the compiler 204 generates a binary code. The first embodiment is effective when the COBOL source code 202 is in existence.

Figure 3:
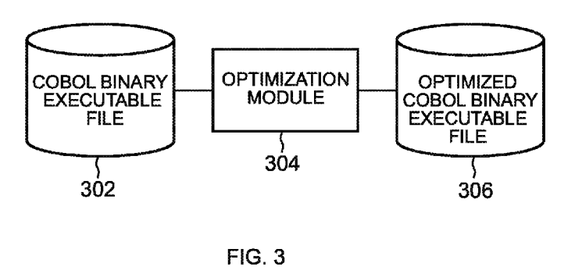
FIG. 3 is a block diagram showing the functional configuration of a second embodiment of the present invention.

In a further embodiment of the present invention, referring to FIG. 3, the hard disk drive 108 stores a COBOL binary executable file 302 that has not been optimized in the sense of the present invention, and an optimization module 304 In this case, in response to an operator's operation, the COBOL binary executable file 302 is converted into an optimized COBOL binary executable file 306 by the conversion module 304 which executes the ZAP instruction removing/reducing function according to the present invention. The second embodiment is effective when there is no source code and only a binary executable file is available because of a legacy program or for other reasons.

Figure 4:
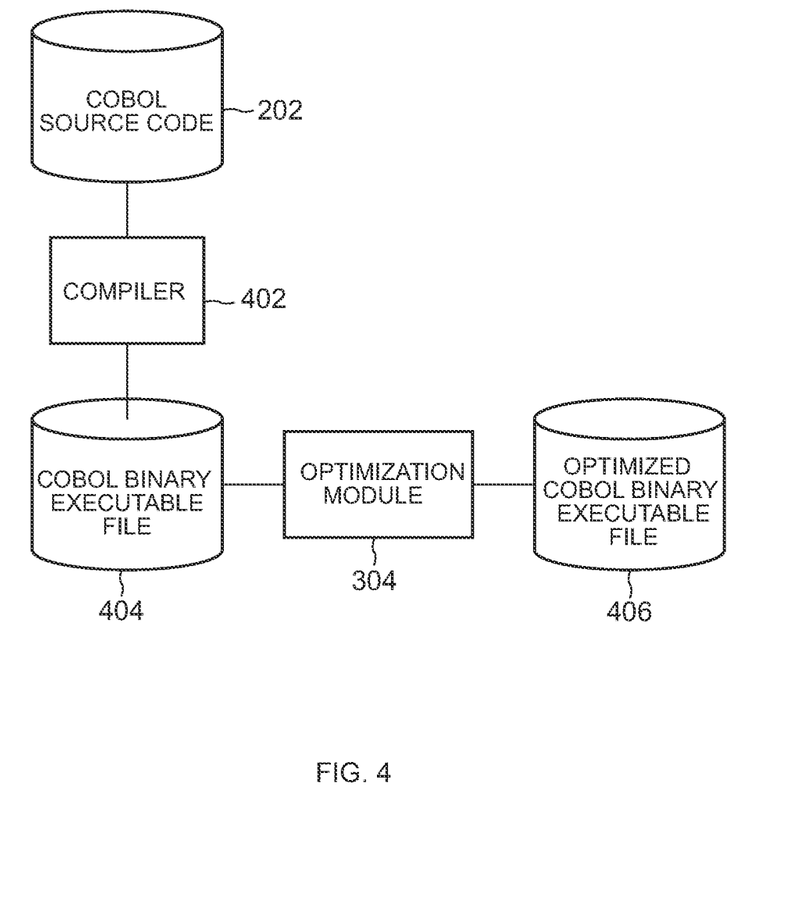
FIG. 4 is a block diagram showing the functional configuration of a third embodiment of the present invention.

In a further embodiment of the present invention, referring to FIG. 4, the hard disk drive 108 stores a COBOL source code 202, a compiler 402 in which the optimization function according to the present invention has not been installed, and an optimization module 304 which is identical to that in FIG. 3. In this case, in response to an operator's operation, the COBOL source code 202 is temporarily converted, by the compiler 402, into a COBOL binary executable file 404 that has not been optimized. Then, the COBOL binary executable file 404 is converted into an optimized COBOL binary executable file 406 by the conversion module 304. This embodiment is effective when a source code and an existing COBOL compiler are both available.

The functions of the optimization module 304 will now be described in reference to the functional block diagram in FIG. 5. The compiler 204 in FIG. 2 has installed the optimization function equivalent to that of the optimization module 304. Therefore, the following description of the functions of the optimization module 304 also describes the code optimization function of the present invention that is included in the compiler 204.

Figure 5:
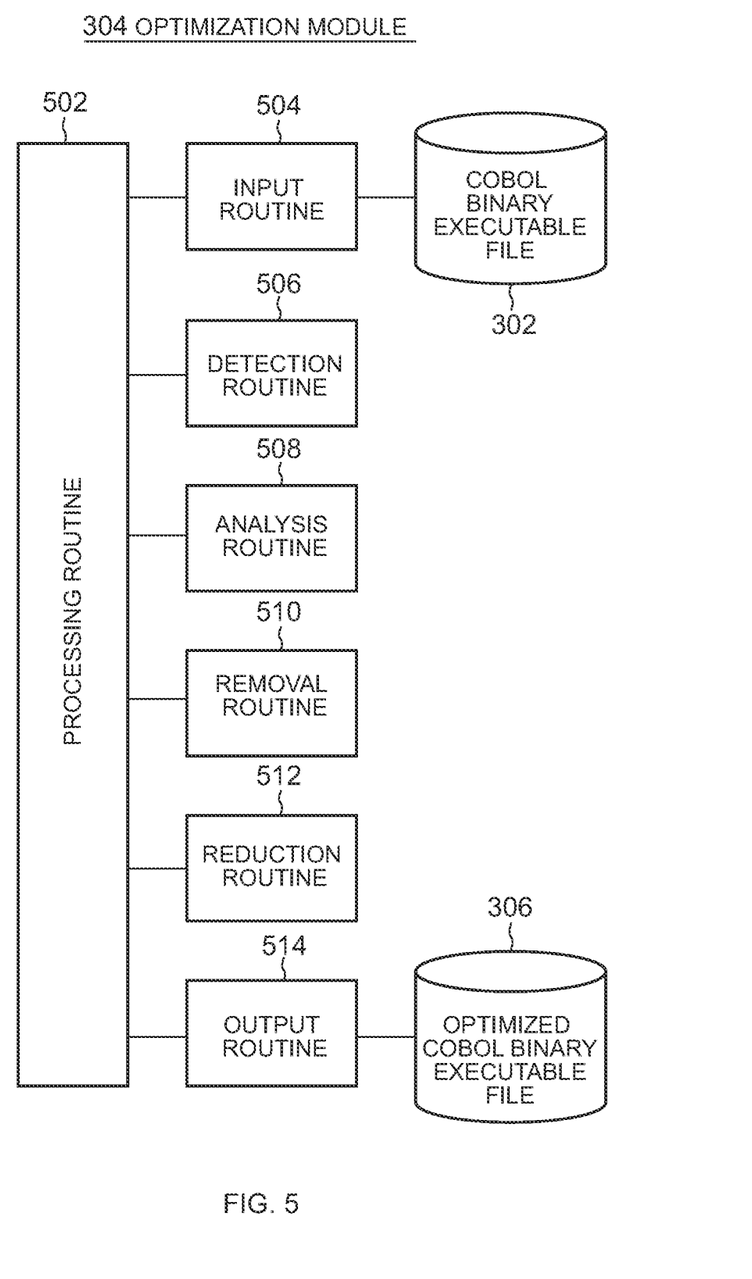
FIG. 5 is a block diagram showing the functional configuration of an optimization module according to a further embodiment of the present invention.

Referring to FIG. 5, the optimization module 304 includes a processing routine 502, an input routine 504, a detection routine 506, an analysis routine 508, a removal routine 510, a reduction routine 512, and an output routine 514. The processing routine 502 integrates all the functions of the optimization module 304. The processing routine 502 calls as appropriate the input routine 504, the detection routine 506, the analysis routine 508, the removal routine 510, the reduction routine 512, and the output routine 514 for processing. The function of the processing routine 502 will be described in reference to the flowchart in FIG. 6.

The input routine 504 has the function of reading the unoptimized COBOL binary executable file 302 stored in the hard disk drive 108.

The detection routine 506 has the function of detecting the position of a ZAP as a candidate for removal in the COBOL binary executable file 302. The function of the detection routine 506 will be described in reference to the flowchart in FIG. 7.

The analysis routine 508 is called during the detection routine 506 to analyze the definitions for an input of a ZAP. The function of the analysis routine 508 will be described in reference to the flowchart in FIG. 8.

The removal routine 510 is called during the detection routine 506 to execute the function of removing a ZAP instruction. The function of the removal routine 510 will be described in reference to the flowchart in FIG. 9.

The reduction routine 512 is called during the detection routine 506 to execute ZAP instruction strength reduction processing. The function of the reduction routine 512 will be described in reference to the flowchart in FIG. 10.

The output routine 514 writes a result of the processing routine 502, as the optimized COBOL binary executable file 306, onto the hard disk drive 108.

The programs for the processing routine 502, the input routine 504, the detection routine 506, the analysis routine 508, the removal routine 510, the reduction routine 512, and the output routine 514 can be written in an arbitrary programming language, such as PL/I, assembler, or REXX, that is compatible with the operating system.

The processes in the routines of the optimization module 304 will be described in reference to the flowcharts in FIGS. 6 to 10.

Figure 6:
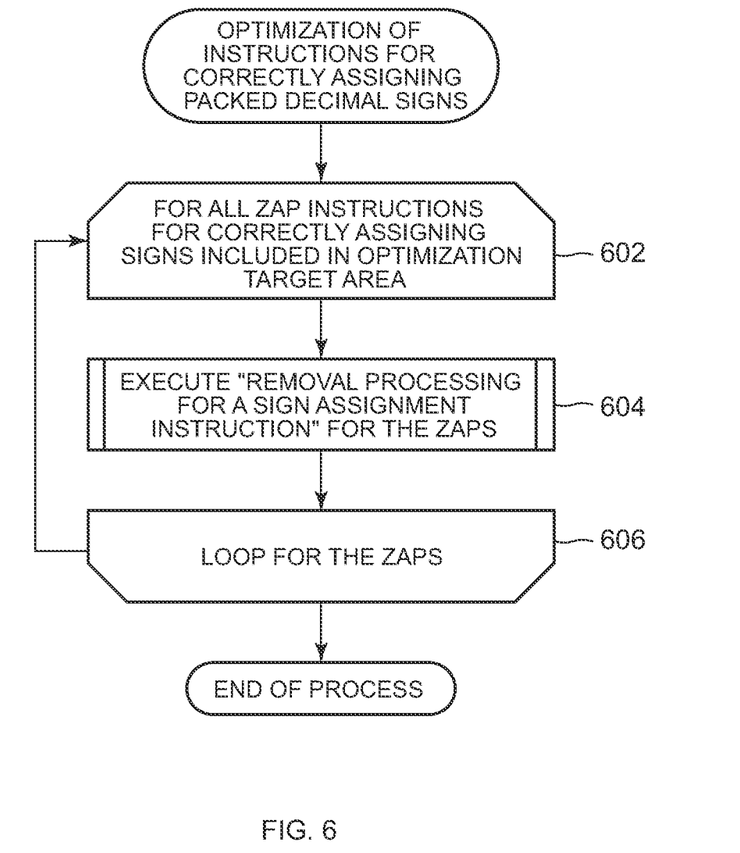
FIG. 6 is a flowchart illustrating the process of a processing routine according to a further embodiment of the present invention.

FIG. 6 is a flowchart illustrating the processing routine 502 for optimization of the instructions for correctly assigning packed decimal signs. Steps 602 to 606 in FIG. 6 all the ZAP instructions for correctly assigning signs in an optimization target area are performed.

In step 604 in the loop, the processing routine 502 calls the detection routine 506, shown in the flowchart in FIG. 7 which will be described below, to execute "removal processing for a sign assignment instruction" for the ZAP instructions.

Once all the ZAP instructions have been checked, the process exits step 606 and is terminated. Although not illustrated in FIG. 6, the processing routine 502 outputs an optimized code as a result of the conversion, by the output routine 514.

Figure 7:
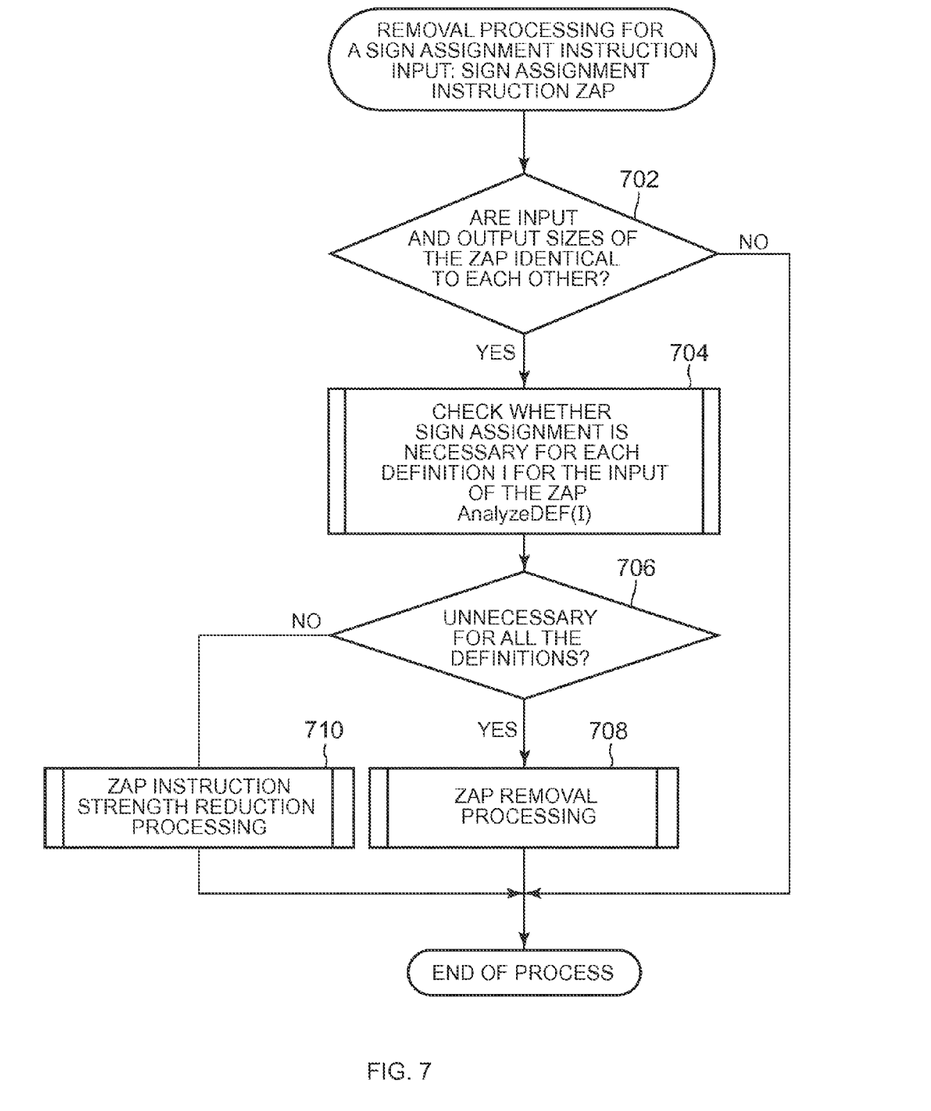
FIG. 7 is a flowchart illustrating the process of a detection routine according to a further embodiment of the present invention.

FIG. 7 is a flowchart illustrating the process of the detection routine 506 which is called in step 604 to execute the removal processing for a sign assignment instruction.

Referring to FIG. 7, in step 702, the detection routine 506 determines whether the input and output sizes of the ZAP are identical to each other. If the sizes are different from each other, the process is terminated without doing anything.

If the detection routine 506 determines in step 702 that the input and output sizes of the ZAP are identical to each other, in step 704, the detection routine 506 calls AnalyzeDEF(I), which is the analysis routine 508, to check whether sign assignment is necessary for each definition I for the input of the ZAP. The process of the analysis routine 508 will be described in detail later with reference to the flowchart in FIG. 8.

The analysis routine 508 returns an analysis result which shows whether the sign assignment is necessary or not. Based on the analysis result, the detection routine 506 determines in step 706 whether the sign assignment is unnecessary for all the definitions.

If the detection routine 506 determines in step 706 that the sign assignment is unnecessary for all the definitions, in step 708, the detection routine 506 calls the removal routine 510 which performs ZAP removal processing, and the process is terminated. The removal routine 510 will be described in detail later in reference to the flowchart in FIG. 9.

If the detection routine 506 determines in step 706 that the sign assignment can be necessary for some definitions. In step 710, the detection routine 506 calls the reduction routine 512 which performs ZAP instruction strength reduction processing, and the process is terminated. The reduction routine 512 will be described in detail later in reference to the flowchart in FIG. 10.

Figure 8:
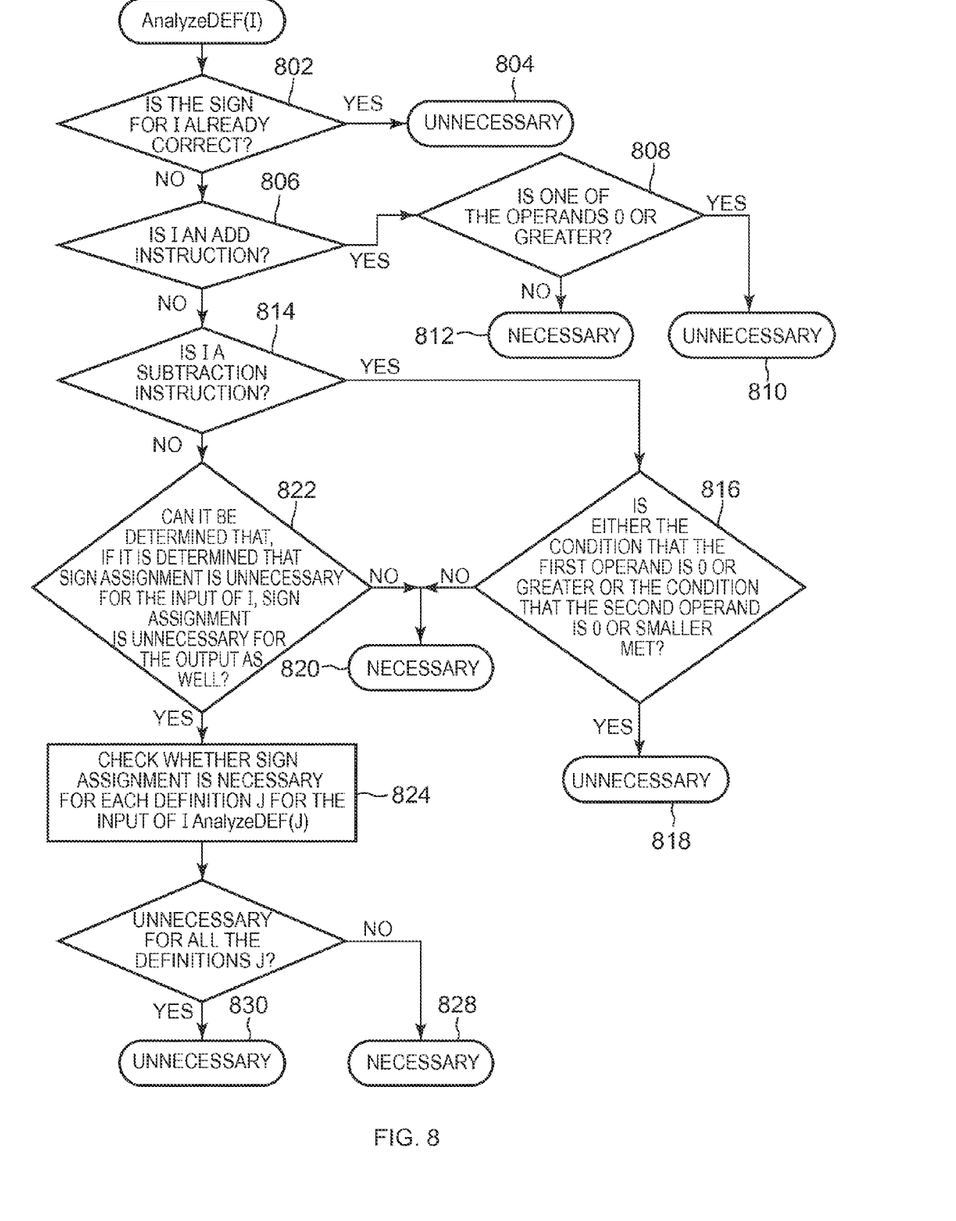
FIG. 8 is a flowchart illustrating the process of an analysis routine according to a further embodiment of the present invention.

FIG. 8 is a flowchart of the analysis routine 508, i.e. AnalyzeDEF(I), where I is for example the following expression, which is shown as I1 below.

001 COMPUTE INPUT=INPUT+1           (I1)

002 ... =ZAP(INPUT)

In a more complex example as follows, the definitions for the input of the ZAP (INPUT) below are I1 and I2.

001 IF ... THEN
002 COMPUTE INPUT = INPUT + 1 --- (I1)
003 ELSE
004 COMPUTE INPUT = INPUT * 2 --- (I2)
005 END-IF.
006 ... = ZAP(INPUT)

The analysis routine 508 determines in step 802 whether the sign for I is already correct. If so, in step 804, the analysis routine 508 returns the determination that the sign assignment is unnecessary.

If the analysis routine 508 cannot determine that the sign for I is already correct, in step 806, the analysis routine 508 determines whether I is an add instruction. If so, in step 808, the analysis routine 508 determines whether one of the operands for calculating I is 0 or greater. If so, the analysis routine 508 returns in step 810 and determines that the sign assignment is unnecessary. Otherwise, the analysis routine 508 returns in step 812 the determination that the sign assignment is necessary.

If the analysis routine 508 determines in step 806 that I is not an add instruction, in step 814, the analysis routine 508 determines whether I is a subtraction instruction. If so, in step 816, the analysis routine 508 determines whether either the condition that the first operand for calculating I is 0 or greater or the condition that the second operand for calculating I is 0 or smaller is met. If so, the analysis routine 508 returns in step 818 the determination that the sign assignment is unnecessary. Otherwise, the analysis routine 508 returns to step 820 that determines that the sign assignment is necessary.

If the analysis routine 508 determines in step 814 that I is not a subtraction instruction, in step 822, the analysis routine 508 determines whether it can be determined that the sign assignment is unnecessary for the output of I when it is determined that the sign assignment is unnecessary for the input of I. This determination can be made from the expression for calculating I. If not in step 822, the analysis routine 508 returns in step 820 the determination that the sign assignment is necessary.

If the analysis routine 508 determines in step 822 that the sign assignment is unnecessary for the input of I, it can be determined that the sign assignment is unnecessary for the output as well. In step 824, the analysis routine 508 checks whether sign assignment is necessary for each definition J for the input of I, by calling AnalyzeDEF(J) recursively.

If the analysis routine 508 determines in step 826 that the sign assignment is unnecessary for all the definitions J, the analysis routine 508 returns in step 830 the determination that the sign assignment is unnecessary. Otherwise, the analysis routine 508 returns in step 828 the determination that the sign assignment is necessary.

Figure 9:
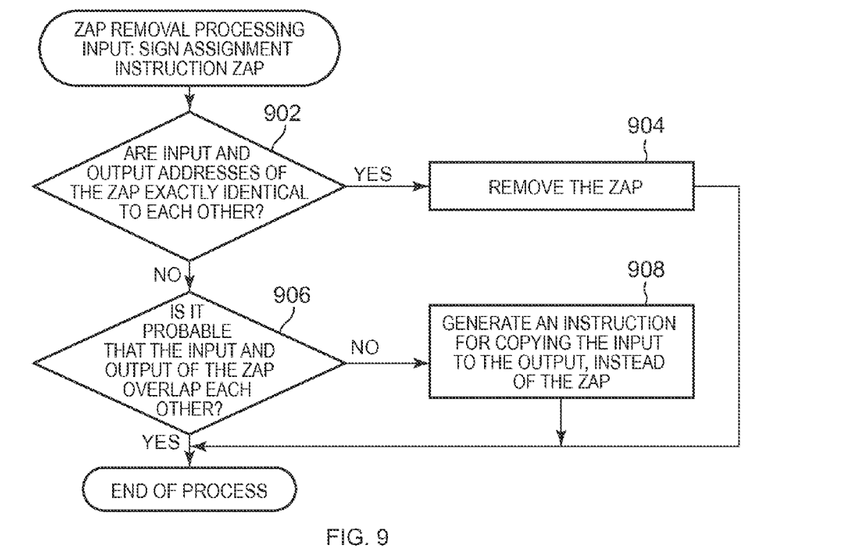
FIG. 9 is a flowchart illustrating the process of a removal routine according to a further embodiment of the present invention.

FIG. 9 is a flowchart illustrating the process of the removal routine 510. Referring to FIG. 9, in step 902, the removal routine 510 determines whether the input and output addresses of the ZAP are exactly identical to each other. If so, the removal routine 510 removes the ZAP in step 904, and the process is terminated.

If the removal routine 510 determines in step 902 that the input and output addresses of the ZAP are not exactly the same then in step 906, the removal routine 510 determines whether it is probable that the input and output addresses of the ZAP overlap each other. If so, the process is terminated without doing anything. The technique of determining whether two memory accesses are overlapping each other is conventionally known. When a memory access is represented as a combination of base address, index, offset, and length, if the input and output are identical in base address and index, the determination as to whether the input and output addresses are overlapping each other can be made on the basis of the offsets and lengths. If the input and output have base addresses and indices different from each other, the analysis is often unachievable, in which case it is necessary to assume that the addresses are overlapping each other. In the alias analysis or the like, there are some cases where it can be determined that the input and output addresses are not overlapping each other.

If the removal routine 510 determines in step 906 that there is no possibility that the input and output addresses of the ZAP overlap each other, in step 908, the removal routine 510 generates an instruction for copying the input to the output, instead of the ZAP, and the process is terminated.

Figure 10:
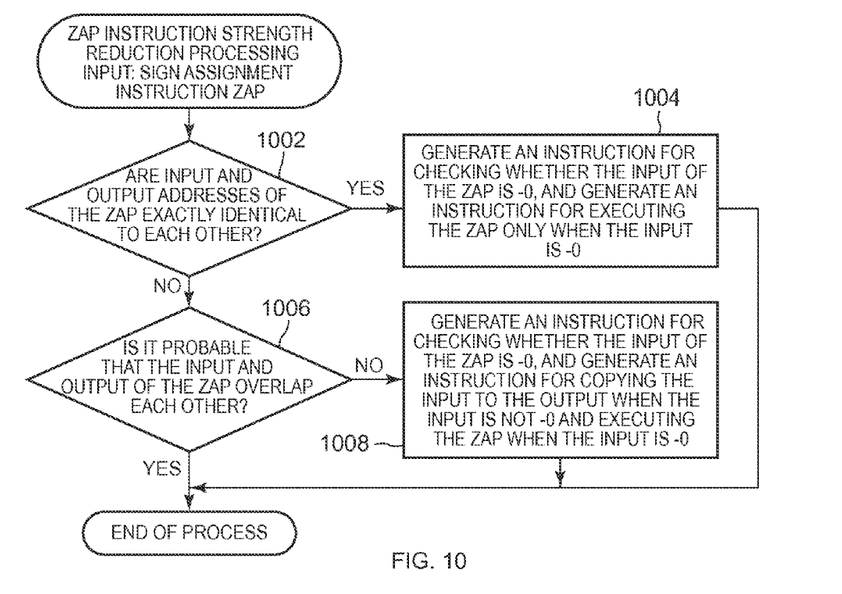
FIG. 10 is a flowchart illustrating the process of a reduction routine according to a further embodiment of the present invention.

FIG. 10 is a flowchart illustrating the process of the reduction routine 512. Referring to FIG. 10, in step 1002, the reduction routine 512 determines whether the input and output addresses of the ZAP are exactly identical to each other. If so, in step 1004, the reduction routine 512 generates an instruction for checking whether the input of the ZAP is −0, and generates an instruction for executing the ZAP only when the input is −0. The process is then terminated. It is noted that the checking of whether the input of the ZAP is −0 is implemented by an instruction for performing an AND between the sign part and 9 by creating a mask value corresponding to the number of digits. This process will be described in detail later in a supplemental description on packed decimal.

If the reduction routine 512 determines in step 1002 that the input and output addresses of the ZAP are not exactly the same, in step 1006, the reduction routine 512 determines whether it is probable that the input and output addresses of the ZAP overlap each other. If so, the process is terminated. The technique of determining whether two memory accesses are overlapping each other can be the same as the one described above in conjunction with step 906.

If the reduction routine 512 determines in step 1006 that there is no possibility that the input and output addresses of the ZAP overlap each other then in step 1008, the reduction routine 512 generates an instruction for checking whether the input of the ZAP is −0, and generates an instruction for copying the input to the output if the input is not −0 and executing the ZAP if the input is −0. The process is then terminated.

A supplemental description will now be made on packed decimal. In packed decimal, the sign part is defined in numerical values as follows:
Positive sign: 12 (preferred), 10, 14, 15
Negative sign: 13 (preferred), 11

The negative sign is 1101 or 1011 in bit representation. In order to rapidly find that the sign part is neither of these values, a code shown by a pseudocode as follows is generated for a ZAP instruction.

tmpReg = F9, FFF9, FFFFF9, or FFFFFFF9, depending on the size of a decimal value (for one byte, two bytes, three bytes, and four or more bytes, respectively) tmpReg &= * (the rightmost address of the decimal value − 3)
if (tmpReg == 9 &&

-continued ((the rightmost byte value of the decimal value & 6) != 2 and ((the rightmost byte value of the decimal value & 6) != 4){
  // Use a TM instruction in System z
  <Do ZAP>
}

If an instruction for System z is used, the following machine code is generated corresponding to the above-described pseudocode.

```
IILF  GPR0,0xFFFFF9
N     GPR0,320(GPR2)          // Perform an AND with variable
CHI   GPR0,9                  // Is the result 9?
BRC   BNERC(0x6), Label SKIP  // Skip if it is not 9
TM    323(GPR2), 0x06         // If it is 10 or 01 in bit representation,
                              1 is set as CC.
BRC   (0xb), Label SKIP       // Skip if it is not 10 or 01 in
                              bit representation
ZAP   321(3,GPR2), 321(3,GPR2)
Label SKIP:
```

The technique of using a code described in the pseudocode as described above is advantageous in that the majority of numbers other than −0 can be excluded by checking tmpReg==9.

Besides this technique, another conceivable technique is to use FF instead of F9 as a mask of the sign byte, and perform an AND and compare the result to see whether it is neither 13 or 11. With this technique, the comparison needs to be made at least twice for any number other than −0.

While the 32-bit instruction was used in the above example, a 64-bit instruction can be used as well. A modified ZAP instruction can further be converted, although it will probably have a little effect on performance. Specifically, it is conceivable to change only the sign by a bit operation so as to set the sign part to 15 by using an OR instruction. This technique is only applicable to up to four byte packed decimal when a 32-bit instruction is used (or up to eight bytes with a 64-bit instruction).

While the present invention has been described above about the case where COBOL code is executed in z/OS on the IBM (registered trademark) System z (registered trademark) architecture, the present invention is not restricted to the above-described case. The present invention can be performed on a computer having an arbitrary architecture, such as a personal computer.

The present invention is applicable, not only to COBOL, but also to an arbitrary programming language that uses a sign assignment instruction for correctly assigning a packed decimal sign.

What is claimed is:

1. A method of converting a computer program into an execution speed optimized computer program, the method comprising:
  detecting, within one of a COBOL source code or a COBOL binary executable program, a sign assignment instruction having an input operand and an output operand identical in size to each other, the sign assignment instruction comprising a ZAP instruction operating on an input operand having a packed decimal format, the sign assignment instruction operating to assign a value of zero to a packed decimal data value of the input operand having a value of negative zero;
  analyzing, based on the detecting, the input operand of the sign assignment instruction to determine whether a value of the input operand results from an add or subtract operation and whether the value is greater than the value prior to the operation; and based on the analyzing determining at least one of that the value of the input operand does not result from an add or subtract operation or that the value is not greater than the value prior to the operation,     checking, based on the input operand and the output operand of the sign assignment instruction having identical addresses, that the input operand of the sign assignment instruction is able to have a value of negative zero;

removing, to create an optimized COBOL binary executable program, the sign assignment instruction comprising the ZAP instruction based on determining addresses of the input operand and the output operand are identical;

replacing, in the optimized COBOL binary executable program based on determining that the input operand and the output operand of the sign assignment instruction have different addresses and do not overlap each other, the sign assignment instruction comprising the ZAP instruction with a copy instruction to copy the input operand to the output operand; and     outputting, based on the removing or replacing, the optimized COBOL binary executable program.

2. The method according to claim 1, wherein the analyzing comprises repetitively analyzing input operand values, based on a determination that the sign assignment instruction is unnecessary for an input value of the input operand of the sign assignment instruction, to determine that the sign assignment instruction is also unnecessary for an output.

3. The method according to claim 1, wherein based on determining that the value of the input operand does not result from an add or subtract operation, or based on determining that the value is not greater than the value prior to the operation, the method further comprising:

checking, based on a determination that addresses of the input operand and the output operand of the sign assignment instruction are not exactly the same and do not overlap each other, a possibility that the value of the input operand of the sign assignment instruction is negative zero; and     inserting the sign assignment instruction only when there is the possibility that the value is negative zero; and     generating and inserting a copy instruction when there is no possibility that the value is negative zero.

4. The method according to claim 1, wherein the checking that the input operand of the sign assignment instruction is able to have a value of negative zero comprises performing an AND between a sign part and 9 by creating a mask value corresponding to a number of digits in the input operand.

5. A computer readable non-transitory article of manufacture tangibly embodying computer readable instructions to convert a computer program into an execution speed optimized computer program, the computer readable instructions, when executed, cause a computer to:

detect, within one of a COBOL source code or a COBOL binary executable program, a sign assignment instruction having an input operand and an output operand identical in size to each other, the sign assignment instruction operating on an input operand having a packed decimal format, the sign assignment instruction comprising a ZAP instruction operating to assign a value of zero to a packed decimal data value of the input operand having a value of negative zero;

analyze, based on detecting the sign assignment instruction, the input operand of the sign assignment instruction to determine whether a value of the input operand results from an add or subtraction operation and whether the value is greater than the value prior to the operation; and based on determining at least one of one of that the value of the input operand does not result from an add or subtract operation or that the value is not greater than the value prior to the operation,     check, based on the input operand and the output operand of the sign assignment instruction having identical addresses, that the input operand of the sign assignment instruction is able to have a value of negative zero     remove, to create an optimized COBOL binary executable program, the sign assignment instruction comprising the ZAP instruction based on a determination that addresses of the input operand and the output operand are identical;

replace, in the optimized COBOL binary executable program based on a determination that the input operand and the output operand of the sign assignment instruction have different addresses and do not overlap each other, the sign assignment instruction comprising the ZAP instruction with a copy instruction to copy the input operand to the output operand; and     output, based on a removal or replacement of the sign assignment instruction comprising the ZAP instruction, the optimized COBOL binary executable program.

6. The computer readable non-transitory article of manufacture according to claim 5, wherein the computer readable instructions to analyze the input operand comprise computer readable instructions to, based on a determination that the sign assignment is unnecessary for an input value of the input operand of the sign assignment instruction, repetitively analyze input operand values to determine that the sign assignment is also unnecessary for an output.

7. The computer readable non-transitory article of manufacture according to claim 5, wherein the computer readable instructions further comprise computer readable instructions to cause the computer to, based on determining that the value of the input operand does not result from an add or subtract operation, or based on determining that the value is not greater than the value prior to the operation:

check, based on a determination that addresses of the input operand and the output operand of the sign assignment instruction are not exactly the same and do not overlap each other, a possibility that the value of the input operand of the sign assignment instruction is negative zero;

insert the sign assignment instruction only when there is the possibility that the value is negative zero; and     generate and insert a copy instruction when there is no possibility that the value is negative zero.

8. The computer readable non-transitory article of manufacture according to claim 5, wherein the computer readable instructions to check that the input operand of the sign assignment instruction is able to have a value of negative zero comprise an instruction for performing an AND between a sign part and 9 by creating a mask value corresponding to a number of digits in the input operand.

9. A computer system comprising:
   a memory;
   a processor communicatively coupled to the memory; and
   an optimization module communicatively coupled to the memory and the processor, wherein the optimization module, when operating:
   detects, within one of a COBOL source code or a COBOL binary executable program, a sign assignment instruction having an input operand and an output operand identical in size to each other, the sign assignment instruction operating on an input operand having a packed decimal format, the sign assignment instruction comprising a ZAP instruction operating to assign a value of zero to a packed decimal data value of the input operand having a value of negative zero; and
   analyzes, based on detection of the sign assignment instruction, the input operand of the sign assignment instruction to determine whether a value of the input operand results from an add or subtraction operation and whether the value is greater than the value prior to the operation;
   based on a determination of at least one of that the value of the input operand does not result from an add or subtract operation and that the value is not greater than the value prior to the operation,
   checks, based on the input operand and the output operand of the sign assignment instruction having identical addresses, that the input operand of the sign assignment instruction is able to have a value of negative zero;
   removes, to create an optimized COBOL binary executable program, the sign assignment instruction comprising the ZAP instruction based on a determination that addresses of the input operand and the output operand are identical;
   replaces, in the optimized COBOL binary executable program based on a determination that the input operand and the output operand of the sign assignment instruction have different addresses and do not overlap each other, the sign assignment instruction comprising the ZAP instruction with a copy instruction to copy the input operand to the output operand; and
   outputs, based on a removal or replacement of the sign assignment instruction comprising the ZAP instruction, the optimized COBOL binary executable program.

* * * * *